United States Patent

[11] 3,550,525

[72] Inventor Sabino Correa Rabello
Rue Eduardo Porto 471, Belo Horizonte-
Minas Gerais, Brazil
[21] Appl. No. 802,850
[22] Filed Feb. 27, 1969
[45] Patented Dec. 29, 1970

[54] GRILLS
3 Claims, 11 Drawing Figs.
[52] U.S. Cl. .................................................. 99/421,
99/446; 126/25, 99/448
[51] Int. Cl. ................................................... A47j 37/04
[50] Field of Search .......................................... 99/421,
339, 419—20, 423, 439, 443, 446, 448; 126/9, 11,
25, 29

[56] References Cited
UNITED STATES PATENTS
| | | | |
|---|---|---|---|
| 1,337,122 | 4/1920 | Doak............................ | 99/421X |
| 1,588,530 | 6/1926 | Currier et al. ................ | 99/421(V) |
| 1,611,397 | 12/1926 | Wells............................ | (99/419)UX |
| 1,656,181 | 1/1928 | Elbert........................... | (99/421H)UX |
| 2,533,080 | 12/1950 | Alexander.................... | (99/421HV)UX |
| 2,734,499 | 2/1956 | Lombardi..................... | 126/25 |
| 3,339,480 | 9/1967 | Raman et al.................. | 99/421(V) |

FOREIGN PATENTS
| | | | |
|---|---|---|---|
| 19,285 | 9/1914 | Great Britain................ | 99/421 |

Primary Examiner—Walter A. Scheel
Assistant Examiner—Arthur O. Henderson
Attorneys—James M. Heilman and Heilman and Heilman ABSTRACT: A charcoal or coal grill having a variety of locations and positions for preparing foods without melted fat, etc. dripping on the hot fuel, and having a removable ash and drip pan.

PATENTED DEC 29 1970
3,550,525
FIG. I.
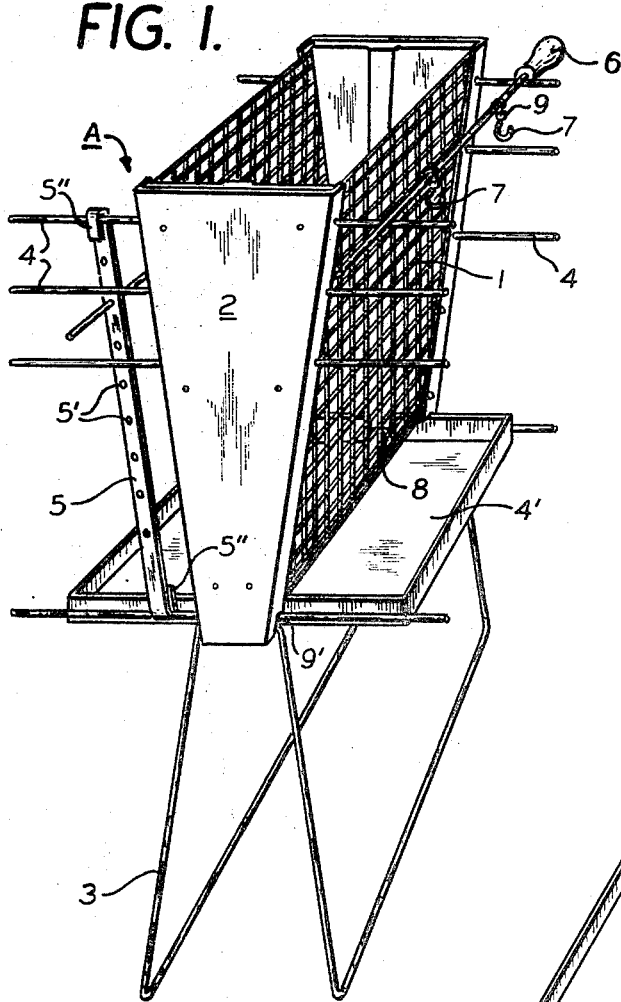
FIG. 6.
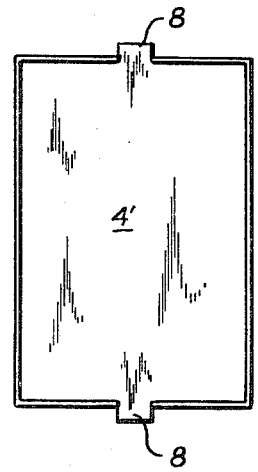
FIG. 7.
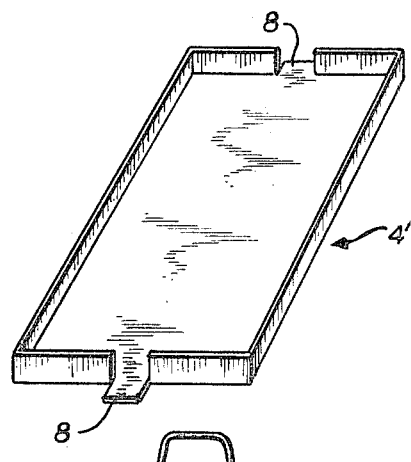
FIG. 4.
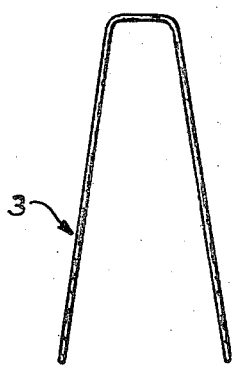
FIG. 5.
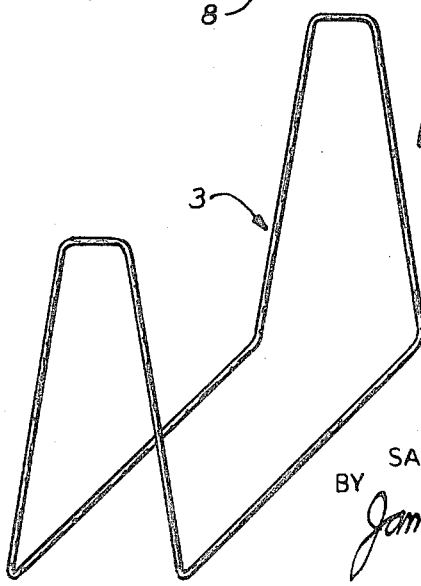
INVENTOR
SABINO CORREA RABELLO
BY
James M. Heilman
ATTORNEY.

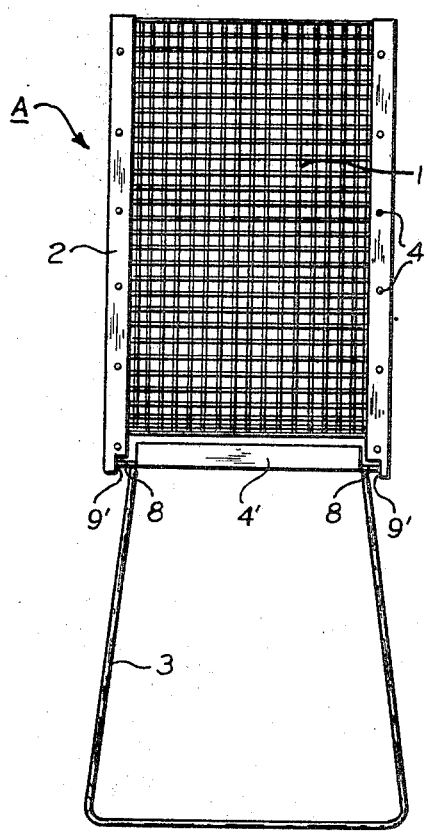
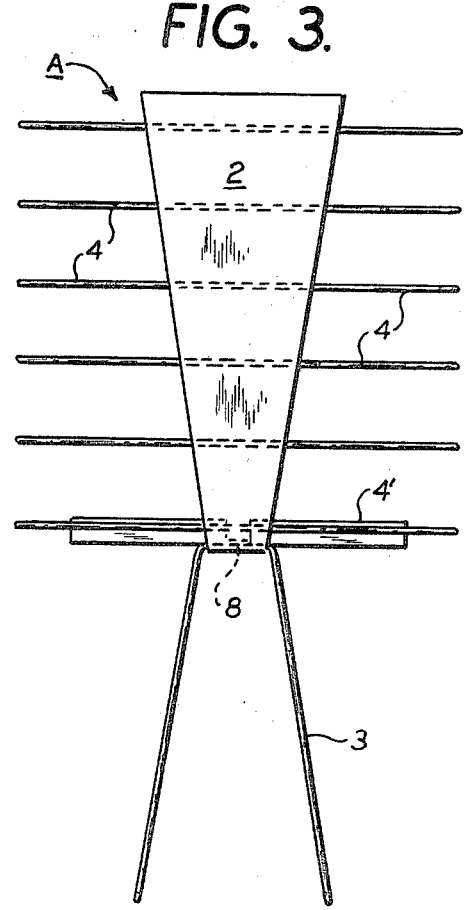
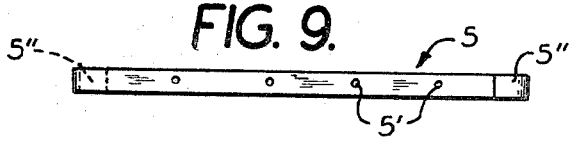
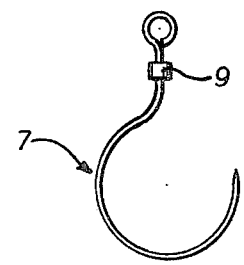
INVENTOR
SABINO CORREA RABELLO
BY *James M. Heilman*
ATTORNEY.

GRILLS

The present invention relates to improvements which are intended to eliminate the problems normally observed in portable charcoal, coal, wood or similar type grills, namely:

a. difficulty of kindling;
b. difficulty of regulating or rendering uniform the distance between the food and the brazier or grill;
c. rising of flames from the combustion of fat oozing from the food and reaching the brazier;
d. lack of versatility;
e. lack of yield or production;
f. difficulty of assembling and disassembling for storage during period of nonuse; and
g. compactness during operative as well as inoperative conditions.

In the annexed drawing, we have a perspective of a grill already provided with the improvements devised. The drawings are of the nature of an example only, since possible alterations of format or arrangement of the foods which make up the projected whole do not constitute any future restrictions or limitations to the general idea if the same functional characteristics like those which will be described are maintained.

Referring to the drawing:

FIG. 1 is a perspective of the grill.
FIG. 2 is a side view of the grill.
FIG. 3 is an end view.
FIG. 4. is an end view of the supporting stand, while FIG. 5 is a perspective view of the stand.
FIGS. 6 and 7 illustrate a top plan view of the drip pan, and a perspective view, respectively.
FIG. 8 illustrates the lateral supporting bars.
FIGS. 9 shows the vertical bars.
FIG. 10 illustrates a skewer, while FIG. 11 illustrates a skewer hook.

As can be seen from an examination of the FIGS. the grill consists of a boxlike structure A intended to serve as a receptacle for the charcoal, coal, wood, briquettes, etc., and whose end section presents a form substantially equal to a "V." The receptacle is constituted by lateral faces 1 of perforated sheet, plate, or wire netting, and end pieces 2 preferably of iron or steel plate and covered with aluminum or any other material for finish effect. The lower end of the end plate is cut out at 9' to receive drain lip 8 and the top of the stand 3.

In the lower part, there is adjusted a removable frame 3, acting as a support of the whole, since above it there is arranged a protective combination drip and ash pan 4' which projects on both sides of the box, and is provided with drain and support lips 8. The pan is insertable in the end pieces 2 and therefore is easily removable.

In the end pieces are arranged equidistant holes, in the vertical, in which will be inserted crosspieces 4 formed by thin rods or bars which will serve to support the various spits which accompany the grill. Bars 5 provided with equidistant holes 5' and bent back ends 5" may be applied to the crosspieces 4 to serve also as supports for skewers 6. The skewers may be used normally without hooks or with rotatable hooks 7, equipped with or without a swivel joint 9.

It is therefore seen that the device is inexpensive, easily movable and storable, and has great flexibility insofar as the quantity and arrangements of the food to be prepared or kept warm.

From this arrangement there result the following advantages:

a. The vertical position of the charcoal or coal box permits kindling by simply applying a small tow or yarn which, steeped in fuel such as alcohol, kerosene or gasoline, in the bottom of the box after loading with charcoal. After igniting the wick, by reason of the vertical shape of the grill, there is formed a chimney effect with a natural draft from below upwardly. Hence, there will be obtained the total ignition of the brazier in about 20 minutes without it being necessary to blow, fan, etc.
b. The lateral position of the crosspieces permits the placing of the food at the most convenient distance in relation to the brazier, without requiring any regulating mechanism.
c. The fat falling from meats will not fall into the brazier, thus avoiding the harmful tongues of flame.
d. The efficiency is very high, as there are used two faces of the brazier simultaneously. Moreover, the production is uninterrupted, since the reloading with charcoal or coal in the upper part does not prevent the utilization of the lower part. This is not the case with other grills where, in reloading, there is a necessary interruption until the coal placed on the remaining embers kindles.
e. The versatility of the model shown is total. Practically all areas can be used. Skewers of wood or iron and spits of normal size may be used with or without rotary hooks. Birds, fish, cutlets, steaks, etc. may be cooked. The rotary hooks permit the exposition of all sides of the food to the brazier, by rotation in the vertical axis, obtained with ease and safety by simple contact of any instrument such as a rod, fork, or knife.
f. The perforated bar permits the efficient use of skewers, as it prevents their undesired rolling, permitting the proper exposure of each face of the spit to the brazier. Obviously, the skewers and the matching holes may be square or rectangular in shape as well as round.

It appears that the devised improvements afford unobvious characteristics and advantages in grills therefore substantiating reasons fully justifying the granting of a patent.

I claim:

1. Improvements in and relating to grills for use of charcoal or coal characterized by a box whose cross section is substantially of an elongated "V" shape, formed by multiperforated lateral faces, and solid metal end pieces, and including a removable ash pan, and further by the fact that the base of the mentioned box is provided with a cut out socket to receive said removable ash pan, and said ash pan projecting on both sides of said box and well beyond its outer upper limits whereby to catch the ash droppings and the drippings from the grilled products, and further by common spits and multiperforated spits, and by the fact that the lateral sides of said end pieces of the box present equidistant holes for insertion of crosspieces or thin bars which serve to support said various common spits and multiperforated spits intended to rotate the foods placed thereon, and in which rotary hooks having a swivel joint are supported on said multiperforated spits, and said solid metal end pieces are iron with decorative aluminized covering thereon, and further by the fact that vertical bars having reverse bent ends are supported by the mentioned cross pieces, and said vertical bars support skewers arranged adjacent the lateral face side pieces.

2. Improvements in and relating to grills characterized in accordance with claim 1 and being demountable and portable, and further by the fact that the elements, placed on the spits and hooks described, are disposed on the two side pieces of the brazier-box, the upper face being free to permit the reloading with fuel without interruption of use.

3. Improvements in and relating to grills for use of charcoal or coal characterized by a box whose cross section is substantially of an elongated "V" shape, formed by multiperforated lateral faces, and solid metal end pieces, and including a removable ash pan, and further by the fact that the base of the mentioned box is provided with a cut out socket to receive said removable ash pan, and said ash pan projecting on both sides of said box and well beyond its outer upper limits whereby to catch the ash droppings and the drippings from the grilled products, and wherein said metal end pieces are provided with edges turned at right angles thereto, said edges being provided with cooperating spaced apertures, crosspieces insertable in said spaced apertures, spits having loosely mounted hooks adapted to be received on said cross pieces at varying distances from the multiperforated lateral faces, said lateral faces being wire mesh, vertical bars having spaced openings and reversely turned ends, said ends being movably placed on and held by said crosspieces, spits insertable into said openings, lips on said ash and drip pan, and a removable stand to contact said lips to support the pan against the cut out sockets of the metal end pieces.